(12) United States Patent
Horikawa et al.

(10) Patent No.: US 11,342,592 B2
(45) Date of Patent: May 24, 2022

(54) ALL-SOLID BATTERY

(71) Applicant: Panasonic Intellectual Property Management Co., Ltd., Osaka (JP)

(72) Inventors: Akihiro Horikawa, Osaka (JP); Kazufumi Miyatake, Osaka (JP); Motohiro Okochi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 16/714,604

(22) Filed: Dec. 13, 2019

(65) Prior Publication Data
US 2020/0212499 A1 Jul. 2, 2020

(30) Foreign Application Priority Data

Dec. 28, 2018 (JP) .............................. JP2018-248456
Dec. 3, 2019 (JP) .............................. JP2019-218456

(51) Int. Cl.
*H01M 10/0585* (2010.01)
*H01M 4/13* (2010.01)
*H01M 4/36* (2006.01)
*H01M 10/0525* (2010.01)
*H01M 10/0562* (2010.01)
*H01M 4/02* (2006.01)

(52) U.S. Cl.
CPC ......... *H01M 10/0585* (2013.01); *H01M 4/13* (2013.01); *H01M 4/366* (2013.01); *H01M 10/0525* (2013.01); *H01M 10/0562* (2013.01); *H01M 2004/021* (2013.01); *H01M 2004/028* (2013.01)

(58) Field of Classification Search
CPC ......... H01M 10/0585; H01M 10/0525; H01M 10/0562; H01M 4/13; H01M 4/366
See application file for complete search history.

(56) References Cited

U.S. PATENT DOCUMENTS 8,945,766 B2  2/2015  Koshida et al.
9,246,161 B2  1/2016  Ueno et al.
(Continued)

FOREIGN PATENT DOCUMENTS

JP   2006-210003   8/2006
JP   2010-245024   10/2010
(Continued)

*Primary Examiner* — Matthew J Merkling
(74) *Attorney, Agent, or Firm* — Wenderoth, Lind & Ponack, L.L.P.

(57) ABSTRACT

An all-solid battery includes a positive-electrode layer having a positive-electrode current collector and a positive-electrode mixture layer, a negative-electrode layer having a negative-electrode current collector and a negative-electrode mixture layer, and a solid electrolyte layer. The positive-electrode mixture layer contains a positive-electrode active material and a solid electrolyte. The solid electrolyte layer is disposed between the positive-electrode mixture layer and the negative-electrode mixture layer. In the positive-electrode mixture layer, the active material volume proportion is larger and the porosity is smaller in a portion closer to the positive-electrode current collector than in a portion far from the positive-electrode current collector.

9 Claims, 4 Drawing Sheets

(56) References Cited

U.S. PATENT DOCUMENTS

| | | | |
|---|---|---|---|
| 2009/0193648 A1* | 8/2009 | In | H01M 4/13 |
| | | | 29/623.3 |
| 2010/0200795 A1* | 8/2010 | Ota | H01M 10/052 |
| | | | 252/62.2 |
| 2012/0052382 A1 | 3/2012 | Koshida et al. | |
| 2012/0115028 A1 | 5/2012 | Ueno et al. | |
| 2013/0252088 A1* | 9/2013 | Kuriki | H01M 4/64 |
| | | | 429/211 |
| 2015/0340741 A1* | 11/2015 | Kim | H01M 4/13 |
| | | | 29/623.1 |
| 2018/0226681 A1 | 8/2018 | Hasegawa et al. | |
| 2020/0014071 A1* | 1/2020 | Nakashima | B60L 58/12 |
| 2021/0167417 A1* | 6/2021 | Chao | H01M 10/052 |

FOREIGN PATENT DOCUMENTS

| | | |
|---|---|---|
| JP | 2012-104270 | 5/2012 |
| JP | 2018-125260 | 8/2018 |

* cited by examiner

ALL-SOLID BATTERY

BACKGROUND

1. Technical Field

The present disclosure relates to a positive-electrode layer, a negative-electrode layer, a solid electrolyte layer, and an all-solid battery using the same.

2. Description of the Related Art

In recent years, development of a secondary battery that can be used repeatedly has been required due to light weighted and cordless electronic devices such as personal computers and mobile phones. Examples of secondary batteries include nickel cadmium batteries, nickel hydrogen batteries, lead storage batteries, and lithium ion batteries. Among these batteries, lithium ion batteries are attracting attention because of the features such as light weight, high voltage, and high energy density.

A lithium ion battery is configured with a positive-electrode layer, a negative-electrode layer, and an electrolyte disposed therebetween. For example, an electrolytic solution in which a supporting salt such as lithium hexafluorophosphate is dissolved in an organic solvent, or a solid electrolyte is used as the electrolyte. At present, lithium ion batteries widely used are flammable because an electrolyte containing an organic solvent is used. Therefore, materials, structures, and systems are needed to ensure the safety of lithium ion batteries. On the other hand, by using a non-combustible solid electrolyte as the electrolyte, it is expected that the above-described materials, structure, and system can be simplified, and it is considered that the increase of energy density, the reduction of manufacturing cost, and the improvement of productivity can be achieved. Hereinafter, a lithium ion battery using a solid electrolyte is referred to as an "all-solid battery".

Solid electrolytes can be roughly divided into organic solid electrolytes and inorganic solid electrolytes. The organic solid electrolyte has an ion conductivity of about $10^{-6}$ S/cm at 25° C., which is extremely lower than that of an electrolyte solution of about $10^{-3}$ S/cm. Therefore, it is difficult to operate an all-solid battery using an organic solid electrolyte in an environment of 25° C. As the inorganic solid electrolyte, there are an oxide-based solid electrolyte and a sulfide-based solid electrolyte. The ion conductivity of these electrolytes is about $10^{-4}$ to $10^{-3}$ S/cm, and the ion conductivity is relatively high. Oxide-based solid electrolytes have high grain-boundary resistance. Therefore, although sintering and thinning of powder are being studied as a means to lower the grain boundary resistance, in a case where sintering is performed, it is difficult to obtain sufficient battery characteristics because the constituent element of the positive electrode or the negative electrode and the constituent element of the solid electrolyte mutually diffuse due to the treatment at high temperature. Therefore, in the all-solid battery using an oxide-based solid electrolyte, studies of thin film are the mainstream. On the other hand, sulfide-based solid electrolytes have small grain boundary resistance compared with oxide-based solid electrolytes, and therefore good characteristics can be obtained only by powder compacting, and research has been actively promoted in recent years.

Under such circumstances, all-solid-state batteries are required to have higher battery capacities, for example, as vehicle-mounted batteries. As a means of high battery capacity, the high concentration of the active material in an electrode active material layer can be mentioned. However, by this means, the occurrence of a crack due to expansion and contraction accompanying charge and discharge becomes remarkable. Therefore, there is a problem that the durability of the all solid battery decreases.

On the other hand, Japanese Patent Unexamined Publication No. 2012-104270 discloses all-solid battery 300 as shown in FIG. 5, in which in the thickness direction of positive-electrode mixture layer 212, the active material concentration in positive-electrode mixture layer 212 which is an electrode active material layer, increases from the interface side of solid electrolyte layer 240 of positive-electrode mixture layer 212 toward the interface side of positive-electrode current collector 211 and the porosity in positive-electrode mixture layer 212 increases from the boundary of solid electrolyte layer 240 toward the boundary of positive-electrode current collector 211.

SUMMARY

An all-solid battery in the present disclosure includes a positive-electrode layer, a negative-electrode layer, and a solid-electrolyte layer. The positive-electrode layer includes a positive-electrode current collector and a positive-electrode mixture layer. The positive-electrode mixture layer is disposed on the positive-electrode current collector and contains at least a positive-electrode active material and a solid electrolyte. The negative-electrode layer includes a negative-electrode current collector and a negative-electrode mixture layer. The negative-electrode mixture layer is disposed on the negative-electrode current collector and contains at least a negative-electrode active material and a solid electrolyte. The solid electrolyte layer is disposed between the positive-electrode mixture layer and the negative-electrode mixture layer and includes at least a solid electrolyte having ion conductivity. When a proportion of a volume of the positive-electrode active material to a sum of the volume of the positive-electrode active material and a volume of the solid electrolyte in the positive-electrode mixture layer is defined as an active material volume proportion, in a case where the positive-electrode mixture layer is divided into divided portions by at least one plane orthogonal to a stacking axis, the active material volume proportion is larger and the porosity is smaller in a divided portion closer to the positive-electrode current collector than in a divided portion far from the positive-electrode current collector.

DETAILED DESCRIPTION

Figure 1:
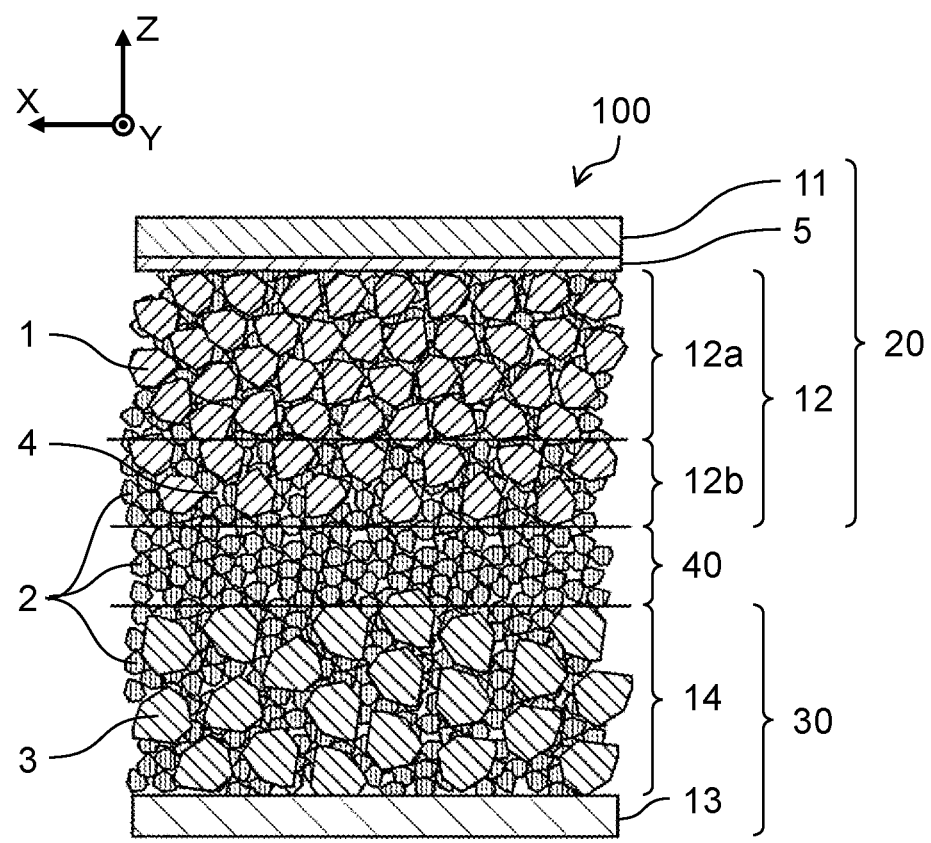
FIG. 1 is a schematic cross-sectional view showing an example of an all-solid battery in the present embodiment.

In the configuration of an all-solid battery of the related art, it is difficult to achieve both the high durability and the high battery capacity of the all-solid battery. Thus, the present disclosure provides an all-solid-state battery having a high battery capacity and improved durability.

(Findings that LED to Present Disclosure)

In the technique of Japanese Patent Unexamined Publication No. 2006-210003, an active material concentration in an electrode active material layer such as a positive-electrode mixture layer is set to a composition larger than 0.7 in order to increase the battery capacity of an all-solid battery. Therefore, the proportion of a solid electrolyte having a function of maintaining the shape of the electrode active material layer by connecting active materials and a function of securing an ion conduction path is extremely reduced. Furthermore, the porosity increases as the electrode active material layer is close to the boundary of a current collector containing more active material. The voids further reduce the function of maintaining the shape of the electrode active material layer and the function of securing the ion conduction path. Therefore, there is a problem that durability and battery capacity decrease.

The present disclosure has been made based on such findings and provides an all-solid-state battery with high battery capacity and improved durability.

The all-solid battery in one aspect of the present disclosure includes a positive-electrode layer, a negative-electrode layer, and a solid-electrolyte layer. The positive-electrode layer has a positive-electrode current collector, and a positive-electrode mixture layer formed on the positive-electrode current collector and containing a positive-electrode active material and a solid electrolyte. The negative-electrode layer has a negative-electrode current collector, and a negative-electrode mixture layer formed on the negative-electrode current collector and containing a negative-electrode active material and a solid electrolyte. The solid electrolyte layer is disposed between the positive-electrode mixture layer and the negative-electrode mixture layer and contains a solid electrolyte having ion conductivity. The proportion of the volume of the positive-electrode active material to the sum of the volume of the positive-electrode active material and the volume of the solid electrolyte in the positive-electrode mixture layer is defined as an active material volume proportion. In a case where the positive-electrode mixture layer is divided into divided portions by at least one plane orthogonal to a stacking axis, the active material volume proportion is larger and the porosity is smaller in a divided portion closer to the positive-electrode current collector than in a divided portion far from the positive-electrode current collector.

Also, for example, the active material volume proportion may increase from the boundary of the solid electrolyte layer of the positive-electrode mixture layer toward the boundary of the positive-electrode current collector in the thickness direction of the positive-electrode mixture layer, and the porosity of the positive-electrode mixture layer may decrease from the interface of the solid electrolyte layer of the positive-electrode mixture layer toward the boundary of the positive-electrode current collector in the thickness direction of the positive-electrode mixture layer.

In the present disclosure, "the active material volume proportion may be larger from the boundary of the solid electrolyte layer of the positive-electrode mixture layer toward the boundary of the positive-electrode current collector, in the thickness direction of the positive-electrode mixture layer" means that the above-described active material volume proportion increases from the boundary of the solid electrolyte layer of the positive-electrode mixture layer toward the boundary of the positive-electrode current collector. More specifically, when comparing the local active material volume proportion of two different portions in the positive-electrode mixture layer, this means that the local active material volume proportion of the portion closer to the positive-electrode current collector is larger than the local active material volume proportion of the portion closer to the solid electrolyte layer, in the positive-electrode mixture layer. The increase in the active material volume proportion in this case includes a continuous increase such as a slope increase and a linear increase, and an intermittent increase such as a stepwise increase.

In addition, "the porosity of the positive-electrode mixture layer may be smaller from the interface of the solid electrolyte layer of the positive-electrode mixture layer toward the boundary of the positive-electrode current collector" means that the porosity of the positive-electrode mixture layer decreases from the boundary of the solid electrolyte layer of the positive-electrode mixture layer toward the boundary of the positive-electrode current collector. More specifically, when comparing the local porosity of two different portions in the positive-electrode mixture layer, this means that the local porosity of the portion closer to the positive-electrode current collector is smaller than the local porosity of the portion closer to the solid electrolyte layer, in the positive-electrode mixture layer. The decrease in porosity in this case includes a continuous decrease such as a slope decrease and a linear reduction, and an intermittent decrease such as a stepwise decrease.

According to the present disclosure, the active material volume proportion of the portion closer to the positive-electrode current collector in the positive-electrode mixture layer is larger than the active material volume proportion of the portion closer to the solid electrolyte layer (far from the positive-electrode current collector). In addition, the porosity of the portion closer to the solid electrolyte layer in the positive-electrode mixture layer (far from the positive-electrode current collector) is larger than the porosity of the portion closer to the other positive-electrode current collector. Thus, even in the positive-electrode mixture layer having a composition for high battery capacity having a large active material volume proportion of the positive-electrode active material, in particular, in a portion close to the positive-electrode current collector of the positive-electrode mixture layer where the volume proportion of the active material is large, the positive-electrode active materials are close to each other in the positive-electrode mixture layer. Therefore, a binding force acts on the expansion and contraction of each positive-electrode active material. Thus, the effect of suppressing damage such as cracks in the positive-electrode mixture layer can be obtained. In addition, the porosity is relatively high in the portion close to the solid electrolyte layer of the positive-electrode mixture layer in which the effect of expansion and contraction of the positive-electrode active material are likely to be apparent. Therefore, the effect of expansion and contraction of the positive-electrode active material can be absorbed by the voids.

Furthermore, the solid electrolyte has a function of maintaining the shape as an electrode by connecting the positive-electrode active materials and securing the ion conduction path. Even in the positive-electrode mixture layer having a composition for high battery capacity having a very small volume proportion of solid electrolyte, the porosity is small particularly in the portion close to the positive-electrode current collector of the positive-electrode mixture layer where the volume proportion of solid electrolyte is small. Therefore, the structural strength capable of maintaining the shape of the positive-electrode mixture layer is not lost by the influence of the voids, and the ion conduction path can be secured. In addition, in the portion close to the solid electrolyte layer of the positive-electrode mixture layer, the volume proportion of the solid electrolyte is relatively large. Therefore, the ion conduction path to the solid electrolyte layer can be easily secured.

Therefore, even if the composition of the positive-electrode mixture layer is a high battery capacity type, the durability of the all-solid battery can be improved. That is, the battery capacity of the all-solid battery can be increased, and the durability can be improved.

In addition, for example, in the all-solid battery, in at least one layer selected from a group consisting of the positive-electrode mixture layer, the negative-electrode mixture layer, and the solid electrolyte layer, the concentration of a solvent may be 0 ppm or more and 50 ppm or less, and the concentration of a binder may be 0 ppm or more and 100 ppm or less.

That is, at least one layer selected from the group consisting of the positive-electrode mixture layer, the negative-electrode mixture layer, and the solid electrolyte layer contains almost no solvent and no binder. Therefore, the deterioration of the solid electrolyte due to the influence of the solvent can be suppressed. Furthermore, the battery capacity is improved by not containing the binder that does not contribute to the battery characteristics. Therefore, the battery capacity of the all-solid battery can be further increased, and the durability can be further improved.

In addition, for example, in the positive-electrode mixture layer, the active material volume proportion of the divided portion closest to the positive-electrode current collector may be larger than 0.7.

That is, the active material volume proportion of the positive-electrode active material in the portion closest to the positive-electrode current collector is high. Therefore, the amount of lithium ions in the positive-electrode mixture layer increases. As a result, the battery capacity of the all-solid battery can be further increased.

In addition, for example, in the positive-electrode mixture layer, the active material volume proportion of the divided portion closest to the solid electrolyte layer may be 0.5 or more.

That is, the active material volume proportion of the positive-electrode active material in the portion closest to the solid electrolyte layer is high. Therefore, the amount of lithium ions in the positive-electrode mixture layer increases. As a result, the battery capacity of the all-solid-state battery can be further increased.

In addition, for example, the positive-electrode mixture layer may include a first positive-electrode mixture layer disposed on the positive-electrode current collector side and a second positive-electrode mixture layer closer to the solid electrolyte layer, and the material volume proportion in the first positive-electrode mixture layer may be larger than the active material volume proportion in the second positive-electrode mixture layer, and the porosity of the first positive-electrode mixture layer may be smaller than the porosity of the second positive-electrode mixture layer.

That is, the positive-electrode mixture layer is formed of a plurality of layers. Therefore, the active material volume proportion and the porosity can be set for each layer. Therefore, it is possible to easily manufacture an all-solid battery having high battery capacity and high durability.

In addition, for example, the active material volume proportion in the first positive-electrode mixture layer may be larger than 0.7.

That is, the active material volume proportion of the positive-electrode active material in the first positive-electrode mixture layer close to the positive-electrode current collector is high. Therefore, the amount of lithium ions in the positive-electrode mixture layer increases. Therefore, the battery capacity of the all-solid battery can be increased.

In addition, for example, the porosity in the first positive-electrode mixture layer may be 0.05% or more and 8% or less.

That is, the porosity of the first positive-electrode mixture layer is small. Therefore, the electrical resistance due to the voids in the positive-electrode mixture layer is reduced. Therefore, the battery capacity of the all-solid battery can be further increased.

In addition, for example, the active material volume proportion in the second positive-electrode mixture layer may be 0.5 or more.

That is, the active material volume proportion of the positive-electrode active material in the second positive-electrode mixture layer close to the solid electrolyte layer is high. Therefore, the amount of lithium ions in the positive-electrode mixture layer increases. Therefore, the battery capacity of the all-solid battery can be increased. In addition, the second positive-electrode mixture layer has a larger number of positive-electrode active materials having low fluidity and high hardness. Therefore, in a case where the positive-electrode mixture layer is pressed by a roll press or the like, the shape of the second positive-electrode mixture layer is maintained, whereby the force of the press is transmitted to the entire positive-electrode mixture layer to be compacted. Therefore, the solid electrolyte and the positive-electrode active material are more closely attached. Therefore, since the ion conduction path is secured, the battery characteristics of the all-solid battery are improved.

In addition, for example, in the all-solid battery, the porosity of the second positive-electrode mixture layer may be 5% or more and 35% or less.

That is, the porosity of the first positive-electrode mixture layer is in an appropriate range. Therefore, the effect of expansion and contraction of the positive-electrode active material can be absorbed by the voids while suppressing an increase in the electrical resistance in the positive-electrode mixture layer due to the voids. Therefore, it is possible to achieve both the high battery capacity and the improvement of the durability of the all-solid battery.

In addition, for example, the all-solid battery may further include a positive-electrode bonding layer in which the positive-electrode layer is disposed between the positive-electrode current collector and the positive-electrode mixture layer and which contains at least a conductive agent.

That is, the positive-electrode current collector and the positive-electrode mixture layer are bonded via the positive-electrode bonding layer. The positive-electrode mixture layer bites into a positive-electrode bonding layer having lower hardness than the positive-electrode active material. Therefore, the adhesive force between the positive-electrode bonding layer and the positive-electrode mixture layer is increased. In addition, in a case where a small amount of binder is contained in the positive-electrode bonding layer, the adhesive force between the positive-electrode bonding layer and the positive-electrode current collector is increased by the adhesive force of the binder. Therefore, by bonding the positive-electrode current collector and the positive-electrode mixture layer via the positive-electrode bonding layer, the adhesive force between the positive-electrode current collector and the positive-electrode mixture layer is increased without impairing the electron conductivity. Therefore, the durability of the all-solid battery can be further improved.

Hereinafter, an all-solid battery according to an embodiment of the present disclosure will be described with reference to drawings. The following embodiments all show one specific example of the present disclosure, and numerical values, shapes, materials, components, arrangement positions and connection forms of the components, and the like are examples, and the present disclosure is not limited thereto. In addition, among components in the following embodiments, components that are not described in independent claims indicating the highest concept of the present disclosure are described as optional components.

In addition, each drawing is a schematic view in which emphasis, omission, or adjustment of proportion is appropriately performed to show the present disclosure, and is not necessarily strictly illustrated, and may be different from the actual shape, positional relationship, and proportion. In the drawings, substantially the same components are denoted by the same reference numerals, and redundant description may be omitted or simplified.

In addition, in the present specification, a term indicating a relationship between elements such as parallel, a term indicating the shape of an element such as a rectangle, and a numerical range are not limited to expressions representing only strict meanings, but are expressions that are meant to include substantially equivalent ranges, for example, differences of several % or so.

In addition, "in a plan view" in the present specification means a case where the all-solid battery is viewed along the laminating direction of the all-solid battery, and "thickness" in the present specification is the length in the laminating direction of the all-solid battery and each layer. Here, the laminating direction (thickness direction) indicates the direction in which one member constituting the all-solid battery is stacked on another member. In the present embodiment, the laminating direction is the positive or negative direction of a Z axis in FIGS. 1 to 4. In addition, it is assumed that the axis along the laminating direction (Z axis in FIGS. 1 to 4) is the stacking axis. That is, in the present embodiment, the plane orthogonal to the stacking axis is an X-Y plane.

In addition, in the present specification, the terms "upper" and "lower" in the configuration of the all-solid-state battery do not refer to the upward direction (vertically upward) and downward direction (vertically downward) in absolute space recognition, but is used as terms defined by the relative positional relationship based on the stacking order in the layered configuration. Further, the terms "upper" and "lower" are applied not only in a case where two components are spaced apart from one another and another component exists between the two components, but also in a case where two components are placed in intimate contact with each other to make the two components meet.

In addition, in the present specification, the cross-sectional view is a view showing a cross-section when the central portion of the all-solid battery is cut in the laminating direction.

Embodiment

[A. All-Solid Battery]

FIG. 1 is a schematic cross-sectional view showing an example of an all-solid battery in the present embodiment. All-solid battery 100 in FIG. 1 includes positive-electrode layer 20, negative-electrode layer 30, and solid electrolyte layer 40. Positive-electrode layer 20 has a positive-electrode current collector 11 and positive-electrode mixture layer 12. Positive-electrode mixture layer 12 is formed on positive-electrode current collector 11 and contains at least positive-electrode active material 1 and solid electrolyte 2. Negative-electrode layer 30 includes negative-electrode current collector 13 and negative-electrode mixture layer 14. Negative-electrode mixture layer 14 is formed on negative-electrode current collector 13 and contains at least negative-electrode active material 3 and solid electrolyte 2. Solid electrolyte layer 40 is disposed between positive-electrode mixture layer 12 and negative-electrode mixture layer 14 and contains at least solid electrolyte 2 having ion conductivity. Furthermore, positive-electrode layer 20 is disposed between positive-electrode current collector 11 and positive-electrode mixture layer 12 and includes positive-electrode bonding layer 5 containing at least a conductive agent.

Positive-electrode layer 20 may not include positive-electrode bonding layer 5 and may be formed in a state in which positive-electrode mixture layer 12 and positive-electrode current collector 11 are in contact with each other.

Here, the proportion of the volume of the positive-electrode active material 1 in positive-electrode mixture layer 12 to the sum of the volume of positive-electrode active material 1 in positive-electrode mixture layer 12 and the volume of solid electrolyte 2 is defined as an active material volume proportion. The active material volume proportion of positive-electrode mixture layer 12 increases from the boundary between positive-electrode mixture layer 12 and solid electrolyte layer 40 toward the boundary between positive-electrode mixture layer 12 and positive-electrode current collector 11, in the thickness direction of positive-electrode mixture layer 12. In addition, the porosity of positive-electrode mixture layer 12 decreases from the interface between positive-electrode mixture layer 12 and solid electrolyte layer 40 toward the interface between positive-electrode mixture layer 12 and positive-electrode current collector 11, in the thickness direction of positive-electrode mixture layer 12. The active material volume proportion is a value obtained by dividing the volume of positive-electrode active material 1 in positive-electrode mixture layer 12 by the total value of the volume of positive-electrode active material 1 and the volume of solid electrolyte 2 in positive-electrode mixture layer 12.

In other words, in a case where positive-electrode mixture layer 12 is divided into divided portions by at least one plane (X-Y plane) orthogonal to the stacking axis (Z axis), the active material volume proportion is larger and the porosity is smaller in a divided portion closer to positive-electrode current collector 11 than in a divided portion far from positive-electrode current collector 11.

In FIG. 1, positive-electrode mixture layer 12 has first positive-electrode mixture layer 12a and second positive-electrode mixture layer 12b. In positive-electrode mixture layer 12, first positive-electrode mixture layer 12a is disposed at a position closer to positive-electrode current collector 11 than second positive-electrode mixture layer 12b in positive-electrode mixture layer 12. Second positive-electrode mixture layer 12b is disposed at a position closer to solid electrolyte layer 40 than first positive-electrode mixture layer 12a in positive-electrode mixture layer 12. Each of first positive-electrode mixture layer 12a and second positive-electrode mixture layer 12b contains positive-electrode active material 1 and solid electrolyte 2. It is assumed that the active material volume proportion (positive-electrode active material volume/[positive-electrode active material volume+solid electrolyte volume]) of first positive-electrode mixture layer 12a is a1, the porosity (proportion of voids 4 in positive-electrode mixture layer 12) of first positive-electrode mixture layer 12a is b1, and the active material volume proportion of second positive-electrode mixture layer 12b is a2, and the porosity of second positive-electrode mixture layer 12b is b2. At this time, the relationships a1>a2 and b1<b2 are satisfied. That is, the active material volume proportion of positive-electrode active material 1 in first positive-electrode mixture layer 12a is larger than the active material volume proportion of positive-electrode active material 1 in second positive-electrode mixture layer 12b, and the porosity of first positive-electrode mixture layer 12a is smaller than the porosity of second positive-electrode mixture layer 12b.

According to the present embodiment, solid electrolyte 2 maintains the shape of positive-electrode mixture layer 12 by connecting positive-electrode active materials 1 and exhibits a function of securing an ion conduction path. In positive-electrode mixture layer 12 having a composition of a high battery capacity type in which the volume proportion of solid electrolyte 2 is very small, the porosity is small particularly in the portion close to positive-electrode current collector 11 where the volume proportion of solid electrolyte 2 is small. Therefore, the ion conduction path in positive-electrode mixture layer 12 can be secured without losing the structural strength capable of maintaining the shape of positive-electrode mixture layer 12 by the influence of the voids.

In addition, in the case of a high battery capacity type all-solid battery having positive-electrode mixture layer 12 having a composition in which the volume proportion of positive-electrode active material 1 is very large, positive-electrode active materials 1 are close to each other in positive-electrode mixture layer 12. Therefore, a mutual restraining force acts on expansion and contraction of positive-electrode active material 1. Therefore, in the inside of positive-electrode mixture layer 12, an effect of suppressing damage due to a crack or the like can be obtained. The influence of the expansion and contraction of positive-electrode active material 1 is noticeable at the interface between positive-electrode mixture layer 12 and solid electrolyte layer 40. According to the present embodiment, in the thickness direction of positive-electrode mixture layer 12, the porosity in positive-electrode mixture layer 12 is larger as positive-electrode mixture layer 12 is closer to the boundary of solid electrolyte layer 40 from the boundary of positive-electrode current collector 11. Therefore, the effect of expansion and contraction of positive-electrode active material 1 which is noticeable at the interface between positive-electrode mixture layer 12 and solid electrolyte layer 40 can be absorbed by the presence of the voids. Therefore, the durability of all-solid battery 100 can be improved.

In addition, in all-solid battery 100, the concentration of the solvent may be 0 ppm or more and 50 ppm or less in at least one layer selected from the group consisting of positive-electrode mixture layer 12, negative-electrode mixture layer 14, and solid electrolyte layer 40. In addition, in at least one layer selected from the group consisting of positive-electrode mixture layer 12, negative-electrode mixture layer 14, and solid electrolyte layer 40, the concentration of the binder may be 0 ppm or more and 100 ppm or less.

Hereinafter, all-solid battery 100 according to the present embodiment will be described for each configuration.

[B. Positive-Electrode Layer]

First, positive-electrode layer 20 in the present embodiment will be described. Positive-electrode layer 20 in the present embodiment includes positive-electrode current collector 11 and positive-electrode mixture layer 12 formed on positive-electrode current collector 11 and containing positive-electrode active material 1 and solid electrolyte 2.

Furthermore, positive-electrode layer 20 is disposed between positive-electrode current collector 11 and positive-electrode mixture layer 12 and includes positive-electrode bonding layer 5 containing at least a conductive agent.

[B-1. Positive-Electrode Mixture Layer]

Positive-electrode mixture layer 12 in the present embodiment is a layer containing at least positive-electrode active material 1 and solid electrolyte 2, and may further contain a conductive assistant as required.

[B-1-2. Positive-Electrode Active Material]

In positive-electrode active material 1 in the present embodiment, metal ions such as lithium (Li) are inserted or separated in the crystal structure at a potential higher than that of negative-electrode layer 30. In addition, positive-electrode active material 1 is a material that undergoes oxidation or reduction along with the insertion or separation of metal ions such as lithium. The type of positive-electrode active material 1 may be appropriately selected according to the type of all-solid battery 100, and examples thereof include an oxide active material and a sulfide active material.

For example, an oxide active material (lithium-containing transition metal oxide) is used as positive-electrode active material 1 in the present embodiment. Examples of the oxide active material include $LiCoO_2$, $LiNiO_2$, $LiMn_2O_4$, $LiCoPO_4$, $LiNiPO_4$, $LiFePO_4$, $LiMnPO_4$, and compounds obtained by substituting the transition metal of these compounds with one or two different elements. Examples of the compound obtained by substituting the transition metal of the above-described compounds with one or two different elements include known materials such as $LiNi_{1/3}Co_{1/3}Mn_{1/3}O_2$, $LiNi_{0.8}Co_{0.15}Al_{0.05}O_2$, $LiNi_{0.5}Mn_{1.5}O_2$ and the like. The positive-electrode active material may be a single compound or a combination of two or more compounds.

Examples of the shape of the positive-electrode active material include particulate and thin film shapes. In a case where the positive-electrode active material is particulate, the average particle diameter ($D_{50}$) of the positive-electrode active material is, for example, preferably in the range of 50 nm to 50 μm inclusive, and more preferably in the range of 1 μm to 15 μm inclusive. When the average particle diameter of the positive-electrode active material is 50 nm or more, the handling property is easily improved. On the other hand, by setting the average particle diameter to 50 μm or less, a flat positive-electrode layer is easily obtained, and therefore the above range is preferable. The "average particle diameter" in the present specification is a volume-based average diameter measured by a laser analysis and scattering particle density distribution measuring device.

The surface of the positive-electrode active material may be coated with a coat layer. The reason for providing the coating layer is that the reaction between the positive-electrode active material (for example, the oxide active material) and the solid electrolyte (for example, the sulfide-based solid electrolyte) can be suppressed. As a material of a coating layer, Li ion conductive oxides, such as $LiNbO_3$, $Li_3PO_4$, and LiPON, can be mentioned, for example. The average thickness of the coating layer is preferably, for example, in the range of 1 nm to 10 nm inclusive.

[B-1-2. Solid Electrolyte]

Hereinafter, the solid electrolyte in the present embodiment will be described.

As shown in FIG. 1, positive-electrode mixture layer 12 in the present embodiment contains positive-electrode active material 1 and solid electrolyte 2. Solid electrolyte 2 may be appropriately selected depending on the type of conductive ion (for example, lithium ion) and can be roughly divided into, for example, a sulfide-based solid electrolyte and an oxide-based solid electrolyte.

The type of the sulfide-based solid electrolyte in the present embodiment is not particularly limited. For example, as the sulfide-based solid electrolyte, for example, $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, $Li_2S$—$P_2S_5$, and the like can be mentioned. In particular, since the conductivity of a lithium ion is excellent, it is preferable to include Li, P, and S. The sulfide-based solid electrolyte may be a single substance or a combination of two or more substances. In addition, the sulfide-based solid electrolyte may be crystalline, amorphous or glass-ceramic. The description of "$Li_2S$—$P_2S_5$" means a sulfide-based solid electrolyte formed using a raw material composition containing $Li_2S$ and $P_2S_5$, and the same applies to other descriptions.

In the present embodiment, one form of the sulfide-based solid electrolyte is a sulfide glass-ceramic containing $Li_2S$ and $P_2S_5$. The ratio of $Li_2S$ to $P_2S_5$ in terms of molar conversion is preferably in the range of 70:30 to 80:20 and more preferably in the range of 75:25 to 80:20. The range of the ratio is preferable for obtaining a crystal structure having high ion conductivity while maintaining the lithium concentration which affects the battery characteristics.

Examples of the shape of the sulfide-based solid electrolyte in the present embodiment include particle shapes such as spherical and elliptical shapes, and thin film shapes. When the sulfide-based solid electrolyte material is in the form of particles, the average particle diameter ($D_{50}$) of the sulfide-based solid electrolyte is not particularly limited, but 10 μm or less is preferred because the density in the positive-electrode layer can be easily improved.

The oxide-based solid electrolyte in the present embodiment will be described. The type of the oxide-based solid electrolyte is not particularly limited, but LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, $Li_{1.5}Al_{0.5}Ge_{1.5}(PO_4)_3$ and the like can be mentioned. The oxide-based solid electrolyte may be a single substance or a combination of two or more substances.

In addition, the type and particle diameter of the solid electrolyte contained in each layer of positive-electrode mixture layer 12, negative-electrode mixture layer 14, and solid electrolyte layer 40 may be different depending on each layer.

[B-1-3. Binder]

Hereinafter, the binder in the present embodiment will be described.

The binder plays a role of binding between positive-electrode active materials 1 in positive-electrode mixture layer 12, between positive-electrode active material 1 and solid electrolyte 2, between solid electrolytes 2, between positive-electrode mixture layer 12 and positive-electrode current collector 11, and between positive-electrode mixture layer 12 and solid electrolyte layer 40. The binder does not directly contribute to the battery characteristics. Therefore, the concentration of the binder contained in positive-electrode mixture layer 12 is desirably 100 ppm or less. In addition, positive-electrode mixture layer 12 may not contain a binder (the concentration of the binder is 0 ppm). By setting the concentration of the binder to 100 ppm or less, it is possible to contain more positive-electrode active material 1 in positive-electrode mixture layer 12, which leads to high battery capacity. In addition, it is possible to prevent an increase in the internal electrical resistance of all-solid battery 100 due to the binder interfering with the ion conduction path and the electron conduction path. Thus, the charge and discharge characteristics of all-solid battery 100 are improved.

In the present specification, concentration refers to concentration by weight unless otherwise noted.

Specifically, examples of the binder include synthetic rubber such as butadiene rubber, isoprene rubber, styrene-butadiene rubber (SBR), styrene-butadiene-styrene copolymer (SBS), styrene-ethylene-butadiene-styrene copolymer (SEBS), ethylene-propylene rubber, butyl rubber, chloroprene rubber, acrylonitrile-butadiene rubber, acrylic rubber, silicone rubber, fluorine rubber and urethane rubber, and the like, and polyvinylidene fluoride (PVDF), polyvinylidene fluoride-hexafluoropropylene copolymer (PVDF-HFP), polyimide, polyamide, polyamide imide, polyvinyl alcohol and chlorinated polyethylene (CPE), and the like.

[B-1-4. Conducting Assistant]

Hereinafter, the conductive assistant in the present embodiment will be described.

In all-solid battery 100 according to the present embodiment, positive-electrode mixture layer 12 may contain a conductive assistant.

The electron conductivity in positive-electrode mixture layer 12 can be increased by adding a conductive assistant. Therefore, the electron conduction path in positive-electrode mixture layer 12 can be secured. Thus, the internal resistance of all-solid battery 100 can be reduced. As a result, the amount of current that can be conducted through the electron conduction path is increased, and the charge and discharge characteristics of all-solid battery 100 are improved.

The conductive assistant in the present embodiment is not particularly limited as long as the conductive assistant improves the electron conductivity of positive-electrode mixture layer 12, but, for example, acetylene black, ketjen black, carbon black, graphite, carbon fiber, and the like can be mentioned. The conductive assistant may be a single substance or a combination of two or more substances.

[B-2. Positive-Electrode Current Collector]

For positive-electrode current collector 11, for example, a foil-like body, a plate-like body, a mesh-like body, or the like made of aluminum, gold, platinum, zinc, copper, SUS, nickel, tin, titanium, or an alloy of two or more thereof is used.

In addition, the thickness and shape of positive-electrode current collector 11 may be appropriately selected according to the application of the all-solid battery.

In addition, about adhesion between positive-electrode mixture layer 12 and positive-electrode current collector 11 in which the concentration of the binder is 0 ppm or more and 100 ppm or less, in the manufacturing process described later, positive-electrode mixture layer 12 bites into positive-electrode current collector 11 to obtain adhesive force by being pressed after positive-electrode mixture layer 12 is formed. Here, although the details of the manufacturing process will be described later, in order to further increase the adhesive force between positive-electrode mixture layer 12 and positive-electrode current collector 11, as shown in FIGS. 1 and 2A, it is desirable to form positive-electrode bonding layer 5 on positive-electrode current collector 11 on the side where positive-electrode mixture layer 12 is formed. Positive-electrode bonding layer 5 has a conductive agent of a conductive carbon material such as carbon having conductivity and lower hardness than positive-electrode active material 1, as a main component. Thereby, as shown in FIG. 2B, when positive-electrode mixture layer 12 is pressed by roll 7, it is promoted that positive-electrode mixture layer 12 bites into positive-electrode bonding layer 5, and the adhesive force between positive-electrode bonding layer 5 and positive-electrode mixture layer 12 becomes high. In addition, since positive-electrode bonding layer 5 contains a small amount of binder, the adhesive force between positive-electrode bonding layer 5 and positive-electrode current collector 11 is increased by the adhesive force of the binder. Therefore, by bonding positive-electrode current collector 11 and positive-electrode mixture layer 12 via positive-electrode bonding layer 5, the adhesive force between positive-electrode current collector 11 and positive-electrode mixture layer 12 can be increased without impairing the electron conductivity.

[B-3. Positive-Electrode Bonding Layer]

Positive-electrode bonding layer 5 has a conductive agent as a main component and also contains a binder. The role of positive-electrode bonding layer 5 is to bond positive-electrode current collector 11 and positive-electrode mixture layer 12 via positive-electrode bonding layer 5.

Examples of the conductive agent include conductive carbon materials such as acetylene black, ketjen black, carbon black, graphite, carbon fiber, and the like. The conductive agent may be a single substance or a combination of two or more substances.

As the binder described above may be used as the binder, the description here is omitted.

[C. Negative-Electrode Layer] Negative-electrode layer 30 in the present embodiment will be described with reference to FIG. 1.

Negative-electrode layer 30 in the present embodiment includes, for example, negative-electrode current collector 13 made of metal foil, and negative-electrode mixture layer 14 formed on negative-electrode current collector 13.

[C-1. Negative-Electrode Mixture Layer]

Negative-electrode mixture layer 14 is a film including at least negative-electrode active material 3 and solid electrolyte 2.

The concentration of the binder contained in negative-electrode mixture layer 14 is preferably 100 ppm or less in negative-electrode mixture layer 14. Negative-electrode mixture layer 14 may not contain a binder (the concentration of the binder is 0 ppm). In addition, negative-electrode mixture layer 14 may contain a conductive assistant. The details of the binder and the conductive assistant are the same as in the positive-electrode mixture layer.

[C-1-1. Negative-Electrode Active Material]

Hereinafter, negative-electrode active material 3 in the present embodiment will be described.

The negative-electrode active material is a material in which metal ions such as lithium is inserted or separated in the crystal structure at a potential lower than that of positive-electrode mixture layer 12 and undergoes oxidation or reduction along with the insertion or separation of metal ions such as lithium.

As negative-electrode active material 3 in the present embodiment, for example, a metal that is easily alloyed with lithium such as lithium, indium, tin, and silicon, hard carbon, carbon materials such as graphite, or known materials including oxide active materials such as $Li_4Ti_5O_{12}$ and SiOx may be used. In addition, as negative-electrode active material 3, a composite obtained by appropriately mixing the above-described negative-electrode active materials may be used.

The ratio of the negative-electrode active material to the solid electrolyte contained in negative-electrode mixture layer 14 is preferably such that the weight ratio is in the range of 40/60 or more and 19 or less and more preferably in the range of 1 or more and 85/15 or less when the weight ratio is a value obtained by dividing the negative-electrode active material by the solid electrolyte in weight conversion. The weight ratio range is preferable for securing both of the ion conduction path and the electron conduction path in negative-electrode mixture layer 14.

[C-1-2. Solid Electrolyte] As the solid electrolyte, the solid electrolyte described above in the section of [B. Positive-Electrode Layer] may be used, and the description thereof is omitted here.

[C-1-3. Binder]

As for the binder, the binder described above in the section [B. Positive-Electrode Layer] may be used, and thus the description thereof is omitted here.

[C-1-4. Conducting Assistant]

As for the conductive assistant, the conductive assistant described above in the section of [B. Positive-Electrode Layer] may be used, and thus the description thereof is omitted here.

[C-2. Negative-Electrode Current Collector]

As negative-electrode current collector 13, for example, a foil-like body, a plate-like body, or a mesh-like body made of SUS, gold, platinum, zinc, copper, nickel, titanium, tin, or an alloy of two or more thereof are used.

In addition, the thickness and shape of negative-electrode current collector 13 may be appropriately selected according to the application of the all-solid battery.

[D. Solid Electrolyte Layer]

Solid electrolyte layer 40 in the present embodiment will be described with reference to FIG. 1.

Solid electrolyte layer 40 in the present embodiment includes at least solid electrolyte 2 having ion conductivity. The binder does not directly contribute to the battery characteristics. Therefore, the concentration of the binder contained in solid electrolyte layer 40 is desirably 100 ppm or less. In addition, solid electrolyte layer 40 may not contain a binder (the concentration of the binder is 0 ppm). As a result, the increase in internal electrical resistance of all-solid battery 100 due to the binder interfering with the ion conduction path can be prevented, and the charge and discharge characteristics of all-solid battery 100 are improved.

[D-1. Solid Electrolyte]

As the solid electrolyte, the solid electrolyte described above in the section of [B. Positive-Electrode Layer] may be used, and the description thereof is omitted here.

[D-2. Binder]

As the binder, the binder described above in the section [B. Positive-Electrode Layer] may be used, and thus the description thereof is omitted here.

[E. Other Configuration]

Although not shown, in all-solid battery 100 according to the present embodiment, a terminal (metal positive-electrode lead) may be attached by welding on the surface of positive-electrode current collector 11 opposite to positive-electrode mixture layer 12 or a terminal (metal negative-electrode lead) may be attached by welding on the surface of negative-electrode current collector 13 opposite to negative-electrode mixture layer 14. The all-solid battery to which the terminal is attached or the all-solid-state battery group obtained by connecting a plurality of the all-solid batteries may be housed in a battery case. In the all-solid battery or all-solid battery group housed in the battery case, the positive-electrode lead and the negative-electrode lead may be led out of the battery case, and the battery case may be sealed.

The above is the description of all-solid battery 100 in the present embodiment.

[F. Manufacturing Method]

[F-1. Manufacturing Method of All-Solid Battery] The method of manufacturing all-solid battery 100 according to the present embodiment includes, for example, a film forming process, a laminating process, and a pressing process. The film forming process is a process of preparing positive-electrode layer 20 having positive-electrode mixture layer 12, negative-electrode layer 30 having negative-electrode mixture layer 14, and solid electrolyte layer 40. The laminating process is a process of obtaining a laminated structure by combining or laminating prepared positive-electrode layer 20, negative-electrode layer 30, and solid electrolyte layer 40 such that solid electrolyte layer 40 is disposed between positive-electrode mixture layer 12 and negative-electrode mixture layer 14. The pressing process is a process of pressing the obtained laminated structure from above and below in the laminating direction.

[F-2. Film Formation Process of Positive-Electrode Layer]

The film forming process of positive-electrode layer 20 in the present embodiment is a process of forming positive-electrode mixture layer 12 on positive-electrode current collector 11. The film forming process of positive-electrode layer 20 includes, for example, a powder laminating process and a powder pressing process. The powder laminating process is a process of uniformly laminating a positive-electrode mixture prepared by mixing solid electrolyte 2 in a powder state (non-slurry), positive-electrode active material 1, and, if necessary, a conductive assistant on positive-electrode current collector 11. The powder pressing process is a process of pressing the laminated body obtained by the powder laminating process.

On the other hand, as another manufacturing method of positive-electrode layer 20, there is a film forming process including a coating process, a drying and baking process, and a coating film pressing process. In the coating process, positive-electrode active material 1, solid electrolyte 2, and, if necessary, the binder and the conductive assistant are dispersed in an organic solvent to make slurry, and the obtained slurry is applied to the surface of positive-electrode current collector 11. In the drying and baking process, the resulting coating is dried by heating to remove the organic solvent. In the coating film pressing process, the dried coating film formed on positive-electrode current collector 11 is pressed. Since the binder does not directly contribute to the battery characteristics, it is desirable that the positive-electrode mixture does not contain the binder. Alternatively, the concentration of the binder contained in positive-electrode mixture is desirably 100 ppm or less.

In addition, in the case of making slurry with an organic solvent, the ion conductivity of the solid electrolyte decreases due to the influence of the organic solvent remaining in positive-electrode mixture layer 12, or huge drying equipment is required to remove the organic solvent. This makes the initial investment cost of the drying equipment and the running cost of energy consumption very high. Therefore, it is preferable to use a method of forming a film by using a method of forming a film without using an organic solvent by using a non-slurry powdery material, or a method of forming a film by using a minute amount of solvent so that the concentration of the solvent contained in positive-electrode mixture layer 12 is 50 ppm or less.

In addition, a method of forming a positive-electrode mixture layer having a composition distribution in which the local active material volume proportion increases intermittently from the boundary of the solid electrolyte layer of the positive-electrode mixture layer toward the boundary of the positive-electrode current collector will be described. For example, there is a method of forming a plurality of positive-electrode mixture layers by press-forming a positive-electrode mixture containing positive-electrode active material 1 and solid electrolyte 2 at different volume proportions and bonding and integrating the plurality of obtained positive-electrode mixture layers. In addition, a method of overcoating ink may be used for forming a positive-electrode mixture containing positive-electrode active material 1 and solid electrolyte 2 at different volume proportions. Furthermore, a positive-electrode mixture containing positive-electrode active material 1 and solid electrolyte 2 at different volume proportions may be formed by overlapping by CVD deposition, PVD deposition or the like. At this time, as the ink for forming a positive-electrode mixture layer, slurry obtained by dispersing the positive-electrode mixture in a solvent may be used. However, as described above, in order to avoid the deterioration of the battery characteristics due to the influence of the organic solvent and the cost increase due to the drying equipment, it is preferable to use a method of forming a film without using an organic solvent, or a method of forming a film with a positive-electrode mixture containing a minute amount of solvent so that the concentration of the solvent contained in positive-electrode mixture layer 12 is 50 ppm or less.

In addition, a method of forming a positive-electrode mixture layer having a composition distribution in which the local active material volume proportion continuously increases from the boundary of the solid electrolyte layer of the positive-electrode mixture layer toward the boundary of the positive-electrode current collector will be described. For example, there is a method of forming a positive-electrode mixture layer by a sputtering method, an inkjet method, or the like so that the volume proportion of positive-electrode active material 1 and solid electrolyte 2 has a continuous gradient. In addition, a method may be used in which a positive-electrode mixture in which positive-electrode active material 1 and solid electrolyte 2 are uniformly mixed is applied to a positive-electrode current collector (for example, aluminum foil and the like) and a magnetic force is applied to move positive-electrode active material 1 and form a composition having a large amount of positive-electrode active material 1 in the interface where the positive-electrode mixture is applied. At this time, in the case of using slurry obtained by dispersing the positive-electrode mixture in a solvent, it is preferable to use a method of forming a film without using an organic solvent, or a method of forming a film with a positive-electrode mixture containing a minute amount of solvent so that the concentration of the solvent contained in positive-electrode mixture layer is 50 ppm or less. This is to avoid the deterioration of the battery characteristics due to the influence of the organic solvent and the cost increase due to the drying equipment as described above.

Here, the method of measuring the organic solvent is not particularly limited, and for example, gas chromatography, mass change method, and the like can be mentioned.

In addition, in a case where positive-electrode layer 20 includes positive-electrode bonding layer 5, before forming positive-electrode mixture layer 12, a paste containing a conductive agent and a binder is applied on positive-electrode current collector 11 and dried to form positive-electrode bonding layer 5. Then, positive-electrode mixture layer 12 is formed on positive-electrode bonding layer 5 formed on positive-electrode current collector 11 by the method described above.

After forming positive-electrode mixture layer 12, in order to improve the density of positive-electrode mixture layer 12 and to improve the adhesion between positive-electrode mixture layer 12 and positive-electrode current collector 11, positive-electrode mixture layer 12 may be pressed from above and below in the laminating direction.

Positive-electrode mixture layer 12 in the present embodiment may have a single-layer structure consisting of a single layer or may have a multilayer structure consisting of two or more layers as shown in FIG. 1. In addition, the thickness of positive-electrode mixture layer 12 is, for example, preferably in the range of 1 µm to 300 µm inclusive, and more preferably in the range of 20 µm to 200 µm inclusive. By setting the thickness of positive-electrode mixture layer 12 to 1 µm or more, sufficient electric capacity can be easily obtained. In addition, by setting the thickness of positive-electrode mixture layer 12 to 300 µm or less, the electrical resistance is less likely to increase, and the output characteristics of the battery are less likely to decrease. The thickness of positive-electrode mixture layer 12 is the total thickness of the respective positive-electrode mixture layers in a case where positive-electrode mixture layer 12 includes a plurality of layers.

In a case where positive-electrode mixture layer 12 in the present embodiment has a two-layer structure, for example, as shown in FIG. 1, positive-electrode mixture layer 12 including first positive-electrode mixture layer 12a disposed closer to positive-electrode current collector 11 and second positive-electrode mixture layer 12b disposed closer to solid electrolyte layer 40 is used.

Ratio (value obtained by dividing thickness of first positive-electrode mixture layer 12a by thickness of positive-electrode mixture layer 12) of thickness (length on stacking axis) of first positive-electrode mixture layer 12a to thickness of positive-electrode mixture layer 12 is, for example, in the range of 0.3 to 0.9. By setting the ratio of the thickness of first positive-electrode mixture layer 12a to the thickness of positive-electrode mixture layer 12 to 0.3 or more, the thickness of first positive-electrode mixture layer 12a having a large proportion of positive-electrode active material 1 is secured. Therefore, sufficient capacity can be obtained. By setting the ratio of the thickness of first positive-electrode mixture layer 12a to the thickness of positive-electrode mixture layer 12 to 0.9 or less (that is, setting the ratio of the thickness of second positive-electrode mixture layer 12b to the thickness of positive-electrode mixture layer 12 to 0.1 or more), the thickness of second positive-electrode mixture layer 12b having a relatively a large proportion of solid electrolyte 2 is secured. Therefore, a sufficient ion conduction path by solid electrolyte 2 can be secured.

Regarding the content of positive-electrode active material 1 in first positive-electrode mixture layer 12a, the total volume of positive-electrode active material 1 contained in first positive-electrode mixture layer 12a is preferably larger than the total volume of solid electrolyte 2 contained in first positive-electrode mixture layer 12a. That is, the active material volume proportion (positive-electrode active material volume/[positive-electrode active material volume+ solid electrolyte volume]) is preferably larger than 0.5, and more preferably larger than 0.7. The reason why the total volume of the positive-electrode active material 1 contained in the first positive-electrode mixture layer 12a is preferably larger than the total volume of solid electrolyte 2 contained in first positive-electrode mixture layer 12a is as follows:

This is because the amount of lithium ions in positive-electrode mixture layer 12 can be increased, and an all-solid-state battery having a high battery capacity can be realized.

In addition, also in second positive-electrode mixture layer 12b facingsolid electrolyte layer 40, the total volume of positive-electrode active material 1 contained in second positive-electrode mixture layer 12b is preferably larger than the total volume of solid electrolyte 2 contained in second positive-electrode mixture layer 12b. That is, the active material volume proportion (positive-electrode active material volume/[positive-electrode active material volume+ solid electrolyte volume]) is preferably 0.5 or more, and more preferably more than 0.5. In addition, in second positive-electrode mixture layer 12b, in order to secure an ion conduction path by solid electrolyte 2, the active material volume proportion is preferably 0.85 or less.

Solid electrolyte 2 maintains the shape of positive-electrode mixture layer 12 by connecting positive-electrode active materials 1 and exhibits a function of securing an ion conduction path. In positive-electrode mixture layer 12 having a high battery capacity type composition in which the concentration of the binder contained in positive-electrode mixture layer 12 and not directly contributing to the battery characteristics is 100 ppm or less and the active material volume proportion is greater than 0.7, the volume proportion of the solid electrolyte is very small. In positive-electrode mixture layer 12 in which the volume proportion of the solid electrolyte is very small, it is desirable to press positive-electrode mixture layer 12 after positive-electrode mixture layer 12 is formed. By pressing solid electrolyte 2 softer than positive-electrode active material 1 onto positive-electrode active material 1 and promoting the sintering of solid electrolyte 2, it is possible to compact positive-electrode mixture layer 12. Therefore, the shape of positive-electrode mixture layer 12 can be maintained.

For the powder pressing process and the coating film pressing process, for example, a roll press capable of continuous processing is desirable in consideration of productivity.

Figure 2:
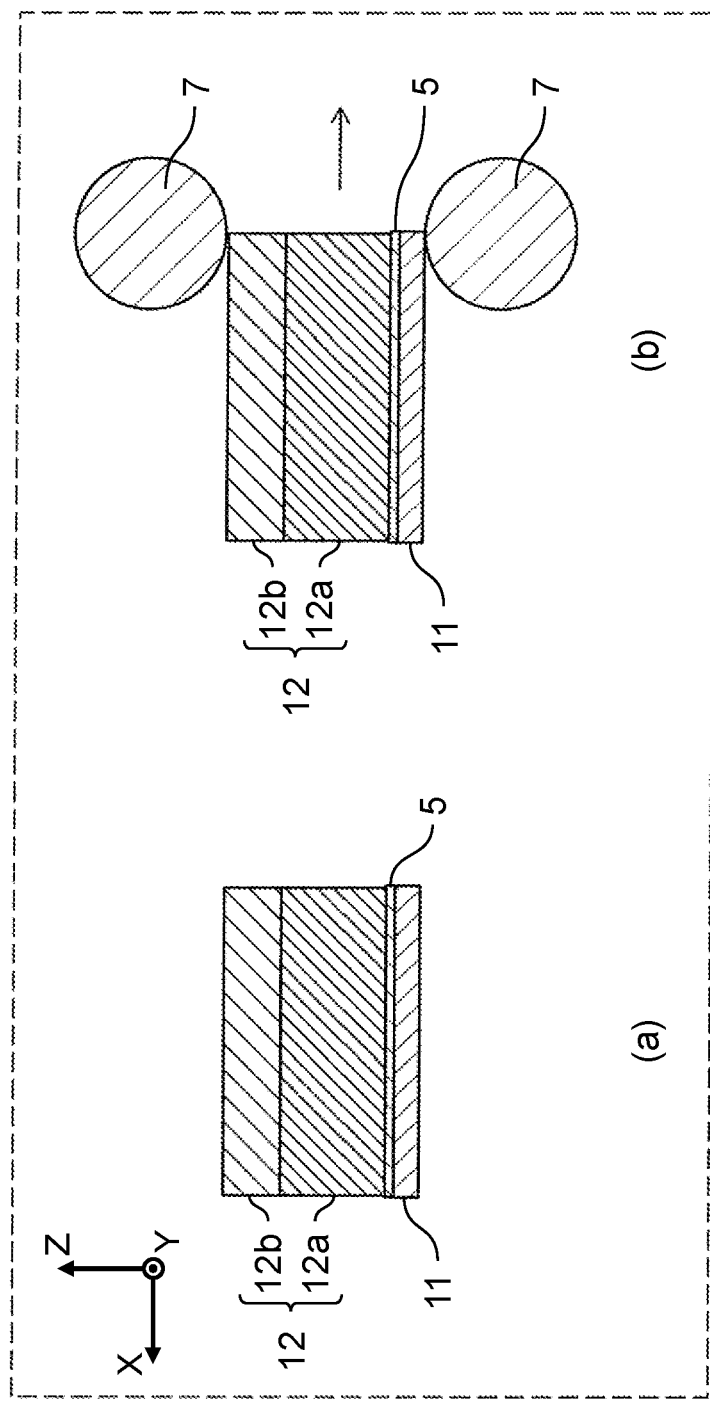
FIG. 2 is a schematic view of a roll pressing process of a positive-electrode mixture layer in a case where an active material volume proportion is 0.5 or more in a second positive-electrode mixture layer in the present embodiment.
Figure 3:
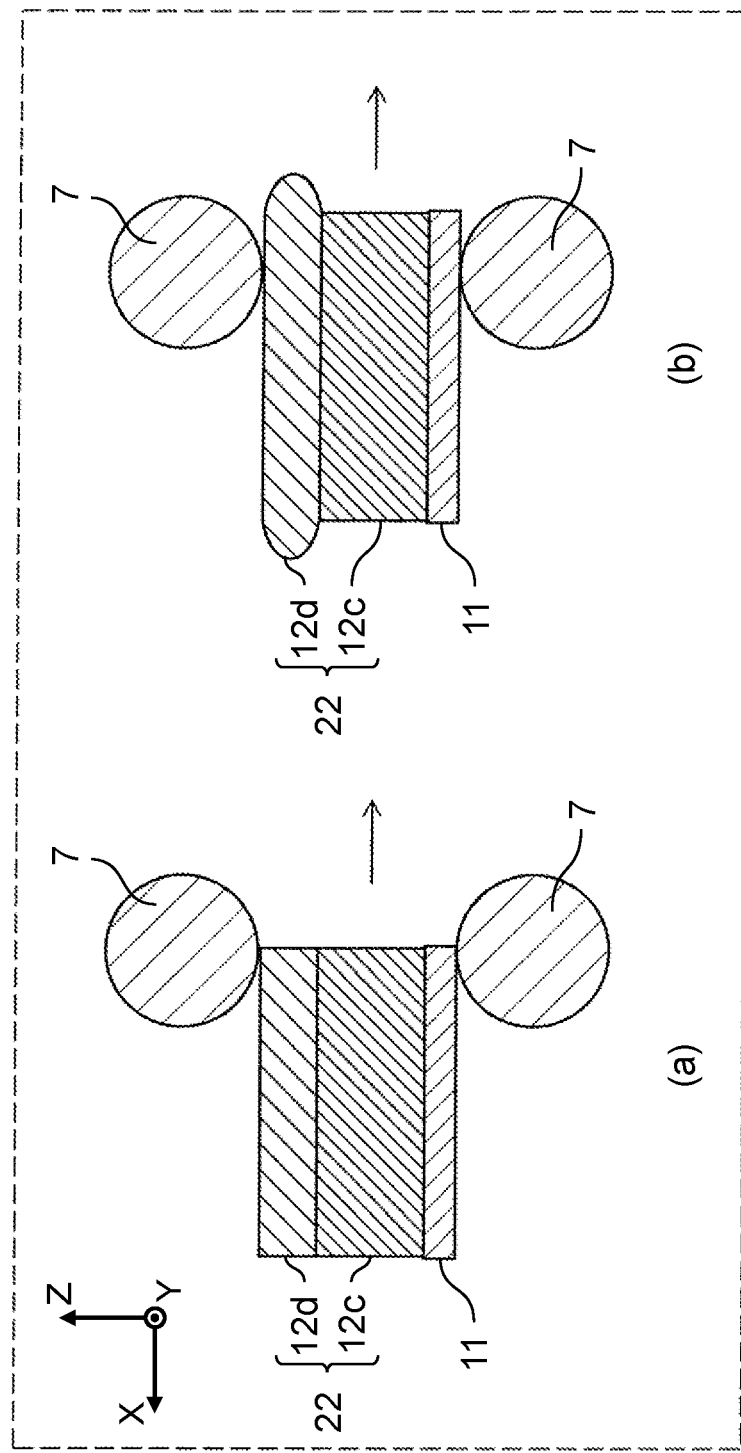
FIG. 3 is a schematic view of a roll pressing process of the positive-electrode mixture layer in a case where the active material volume proportion is less than 0.5 in the second positive-electrode mixture layer in the present embodiment.

FIGS. 2 and 3 are schematic views showing a process of roll-pressing positive-electrode mixture layer 12 formed on positive-electrode current collector 11. FIG. 2 shows the case where the active material volume proportion is 0.5 or more in second positive-electrode mixture layer 12b, and FIG. 3 shows the case the active material volume proportion is less than 0.5 in second positive-electrode mixture layer 12b.

FIG. 2A shows a cross section showing a state in which positive-electrode mixture layer 12 is laminated on positive-electrode current collector 11 with the positive-electrode bonding layer 5 interposed therebetween. FIG. 2B shows a cross section in the roll press of the laminated body of FIG. 2A. In addition, FIG. 3A shows a cross section of the laminated body in which positive-electrode mixture layer 12 is laminated on positive-electrode current collector 11 at the start of roll pressing. FIG. 3B shows a cross section in the roll press of the laminated body of FIG. 3A.

In the example shown in FIG. 2, the active material volume proportion of second positive-electrode mixture layer 12b directly pressed by roll 7 is 0.5 or more. As shown in FIG. 2B, in second positive-electrode mixture layer 12b, a large number of positive-electrode active materials 1 having low fluidity and high hardness do not diffuse the force applied by the roll press. Therefore, the force is sufficiently transmitted to first positive-electrode mixture layer 12a disposed closer to positive-electrode current collector 11 in positive-electrode mixture layer 12. Thus, the entire positive-electrode mixture layer 12 is uniformly pressed so as to be compacted. Therefore, it is possible to maintain the shape of positive-electrode mixture layer 12 having a high battery capacity type composition in which the concentration of the binder is 100 ppm or less and the volume proportion of solid electrolyte 2 is very small. That is, as shown in FIGS. 2A and 2B, there is almost no change in shape even if roll pressing is performed on positive-electrode mixture layer 12. In addition, the force applied by the roll press is sufficiently transmitted to first positive-electrode mixture layer 12a disposed closer to positive-electrode current collector 11 in positive-electrode mixture layer 12 without diffusion. Therefore, it is possible to sufficiently push solid electrolyte 2 having fluidity into the gap between positive-electrode active materials 1 in first positive-electrode mixture layer 12a. Therefore, positive-electrode active materials 1 can be sufficiently adhered to each other with the minimum solid electrolyte 2 to secure the ion conduction path, and it is possible to reduce the porosity of first positive-electrode mixture layer 12a.

On the other hand, in the example shown in FIG. 3, the active material volume proportion of second positive-electrode mixture layer 12d directly pressed by roll 7 on solid electrolyte layer 40 side is less than 0.5. In second positive-electrode mixture layer 12d, the volume proportion of solid electrolyte 2 having high fluidity is high. Therefore, as shown in FIGS. 3A and 3B, the flow of solid electrolyte 2 causes second positive-electrode mixture layer 12d to spread outward in the four directions (positive and negative directions of X and Y axes). Thus, the force applied by the roll press is diffused and is not sufficiently transmitted to first positive-electrode mixture layer 12c disposed closer to positive-electrode current collector 11 in positive-electrode mixture layer 12. Therefore, it is difficult to sufficiently push solid electrolyte 2 in first positive-electrode mixture layer 12c into the gap between positive-electrode active materials 1, and solid electrolyte 2 in first positive-electrode mixture layer 12c cannot be compacted. As a result, it is difficult to maintain the shape of positive-electrode mixture layer 12.

In addition, it is more desirable to apply heat during roll pressing. Thereby, the effect of the further fluid improvement and sintering promotion of solid electrolyte 2 can be obtained.

In addition, the porosity of positive-electrode mixture layer 12 may be smaller as approaching from the boundary of the solid electrolyte layer of positive-electrode mixture layer 12 toward the boundary of the current collector. For example, in any place in positive-electrode mixture layer 12, the porosity of positive-electrode mixture layer 12 is preferably in the range of 0.05% to 35% inclusive, and more preferably in the range of 0.1% to 15% inclusive.

Here, regarding the porosity, the case of a two-layer structure in which positive-electrode mixture layer 12 in the present embodiment includes first positive-electrode mixture layer 12a and second positive-electrode mixture layer 12b will be described.

Generally, in a case where the porosity of the positive-electrode mixture layer is too small, the voids cannot sufficiently absorb mechanical displacement due to expansion and contraction of the positive-electrode active material. Therefore, there is a possibility that positive-electrode mixture layer 12 may be warped, distorted, cracked or the like. On the other hand, in a case where the porosity of positive-electrode mixture layer 12 is too large, the electrical resistance of positive-electrode mixture layer 12 may increase.

In first positive-electrode mixture layer 12a, the concentration of the binder not directly contributing to the battery characteristics is 100 ppm or less, and the active material volume proportion is larger than 0.7. That is, first positive-electrode mixture layer 12a has a high battery capacity type composition with a very small volume proportion of the solid electrolyte. Therefore, in first positive-electrode mixture layer 12a facing positive-electrode current collector 11, the function of connecting positive-electrode active materials 1 is easily damaged by the voids. Therefore, it tends to be difficult to maintain the shape of first positive-electrode mixture layer 12a. Therefore, in such first positive-electrode mixture layer 12a, it is desirable to reduce the porosity. Here, in first positive-electrode mixture layer 12a, positive-electrode active materials 1 are close to each other. Therefore, a mutual restraining force acts on expansion and contraction of positive-electrode active material 1. Therefore, an effect of suppressing damage due to a crack or the like in first positive-electrode mixture layer 12a can be obtained. That is, in a case where the active material volume proportion of first positive-electrode mixture layer 12a is larger than 0.7, as compared with the case where the active material volume proportion of first positive-electrode mixture layer 12a is 0.7 or less, since the number of voids for absorbing displacement due to expansion and contraction of positive-electrode active material 1 may be small, the porosity may be set small.

On the other hand, the influence of expansion and contraction of positive-electrode active material 1 is noticeable at the boundary of positive-electrode mixture layer 12 facing solid electrolyte layer 40, the boundary having a relatively small active material volume proportion. Therefore, second positive-electrode mixture layer 12b facing solid electrolyte layer 40 in positive-electrode mixture layer 12 needs to have sufficient voids to absorb mechanical displacement due to expansion and contraction of positive-electrode active material 1.

Therefore, according to the present embodiment, first positive-electrode mixture layer 12a facing positive-electrode current collector 11 has composition for a high battery capacity that contains a large amount of positive-electrode active material 1 and the volume proportion of solid electrolyte 2 is very small, the porosity may be decreased. In addition, it is desirable to provide second positive-electrode mixture layer 12b having a larger porosity than first positive-electrode mixture layer 12a facing solid electrolyte layer 40 rather than first positive-electrode mixture layer 12a. Thereby, also in positive-electrode mixture layer 12 having a composition for a high battery capacity, which contains a large amount of positive-electrode active material 1 and in which the volume proportion of solid electrolyte 2 is very small, a sufficient ion conduction path can be secured without losing the structural strength capable of maintaining the shape of positive-electrode mixture layer 12 by the influence of the voids. Furthermore, the effect of expansion and contraction of positive-electrode active material 1 which is noticeable at the interface between positive-electrode mixture layer 12 and solid electrolyte layer 40 can be absorbed by the voids of second positive-electrode mixture layer 12b. Therefore, since a large amount of positive-electrode active material 1 is contained in positive-electrode mixture layer 12, it is possible to improve the durability of all-solid battery 100, which has a high battery capacity. The porosity of first positive-electrode mixture layer 12a is, for example, preferably in the range of 0.05% to 8% inclusive, and more preferably in the range of 0.1% to 5% inclusive. The porosity of second positive-electrode mixture layer 12b is preferably in the range of 5% to 35% inclusive, for example, within the range where the porosity is larger than that of first positive-electrode mixture layer 12a, and more preferably in the range of 8% to 15% inclusive.

The porosity of positive-electrode mixture layer 12 is the proportion of the volume occupied by the voids in positive-electrode mixture layer 12 with respect to the apparent volume of positive-electrode mixture layer 12. Specifically, the total volume of each material contained in positive-electrode mixture layer 12 is calculated from the weight and density of each material contained in positive-electrode mixture layer 12. The porosity can be determined by calculation from the total volume of each material and the actual apparent volume of positive-electrode mixture layer 12. That is, the porosity (%) is a value obtained by dividing the difference between the apparent volume and the sum of the volumes of the respective materials by the apparent volume and multiplying by 100.

In addition, the porosity of positive-electrode mixture layer 12 can be adjusted when forming positive-electrode mixture layer 12. Specifically, the porosity can be adjusted by changing the press pressure and press temperature at the time of press-molding the material constituting positive-electrode mixture layer 12, the degree of dispersion of the material constituting positive-electrode mixture layer 12.

[F-3. Film Forming Process of Negative-Electrode Layer]

Since the film forming process of negative-electrode layer 30 in the present embodiment is basically the same as the film forming process of positive-electrode layer 20 except that the active material to be used is changed to negative-electrode active material 3, the description thereof is omitted here.

[F-4. Film Forming Process of Solid Electrolyte Layer]

Since the film forming process of solid electrolyte layer 40 in the present embodiment is basically the same as the film forming process of positive-electrode layer 20 except that the material to be used is changed to a solid electrolyte without using an active material or conductive assistant and solid electrolyte layer 40 is formed on at least one of positive-electrode layer 20, negative-electrode layer 30, and another substrate, the description thereof is omitted here.

[F-5. Laminating Process and Pressing Process]

In the laminating process, positive-electrode layer 20, negative-electrode layer 30, and solid electrolyte layer 40 obtained by the film forming process are laminated such that solid electrolyte layer 40 is disposed between positive-electrode mixture layer 12 and negative-electrode mixture layer 14 to obtain a laminated structure. In the press process, the laminated structure obtained in the laminating process is pressed in the laminating direction from the outside of positive-electrode current collector 11 and negative-electrode current collector 13 to obtain all-solid battery 100.

The purpose of the pressing process is to increase the density (filling ratio) of positive-electrode mixture layer 12, negative-electrode mixture layer 14, and solid electrolyte layer 40. By increasing the density (filling ratio), lithium ion conductivity and electron conductivity can be improved in positive-electrode mixture layer 12, negative-electrode mixture layer 14, and solid electrolyte layer 40, and good battery characteristics can be obtained.

(Modification Example)

Below, a modification example of the embodiment is described by using FIG. 4. In the following description of the modification example, differences from the embodiment will be mainly described, and the description of the common points will be omitted or simplified.

Figure 4:
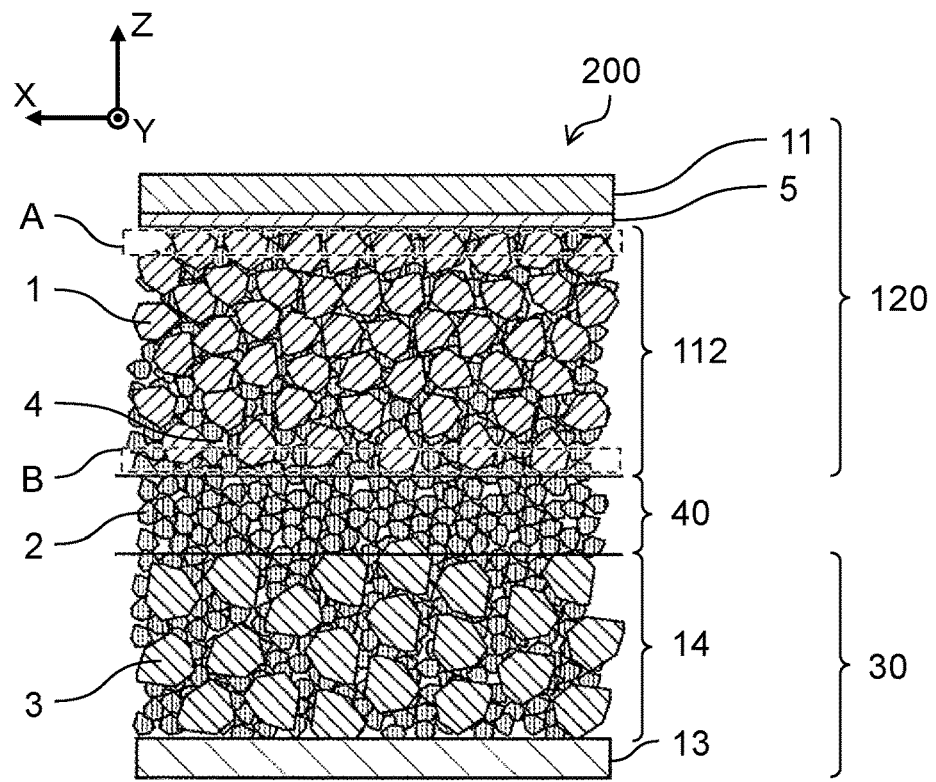
FIG. 4 is a schematic cross-sectional view showing an example of an all-solid-state battery in a modification example of the present embodiment.
Figure 5:
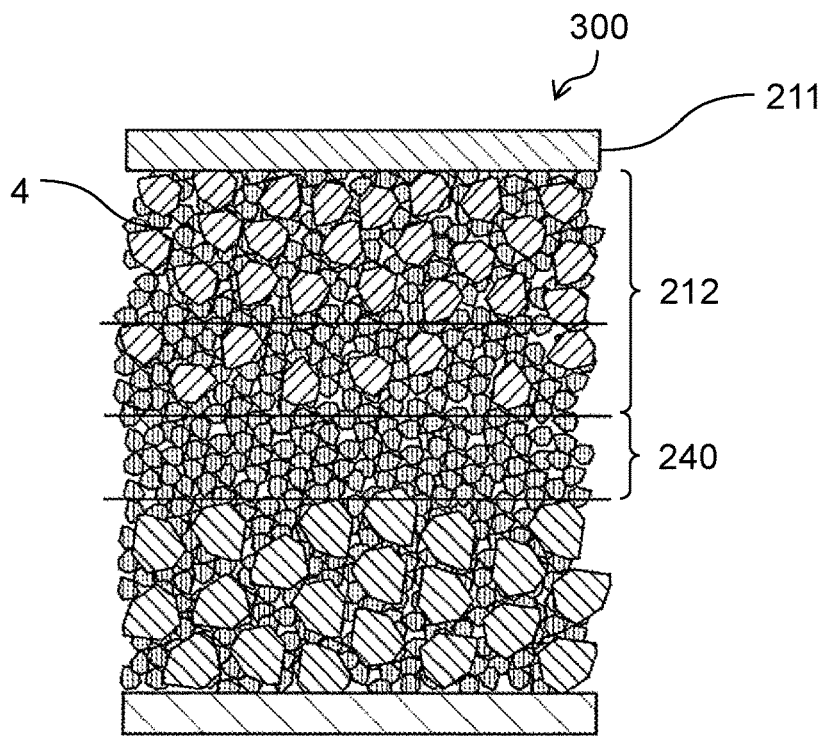
FIG. 5 is a schematic cross-sectional view showing an example of an all-solid-state battery of the related art.

FIG. 4 is a schematic cross-sectional view of all-solid battery 200 according to a modification example of the embodiment. FIG. 4 shows the case where positive-electrode mixture layer 112 is a single layer in positive-electrode layer 120. In a case where positive-electrode mixture layer 112 is a single layer, it is preferable that the active material volume proportion in the portion close to positive-electrode current collector 11 in positive-electrode mixture layer 112 is, for example, 0.7 or more. In addition, the porosity of the portion close to positive-electrode current collector 11 in positive-electrode mixture layer 112 is, for example, preferably in the range of 0.05% to 8% inclusive, and more preferably in the range of 0.1% to 5% inclusive. Here, "the portion close to positive-electrode current collector 11 in positive-electrode mixture layer 112" refers to a region (region indicated by A in FIG. 4) in which the distance from the interface between positive-electrode mixture layer 112 and positive-electrode bonding layer 5 (positive-electrode current collector 11 in a case where positive-electrode bonding layer 5 is not provided) is within $\frac{1}{10}$ of the thickness of positive-electrode mixture layer 112 in the laminating direction.

In addition, the active material volume proportion of the portion close to solid electrolyte layer 40 in positive-electrode mixture layer 112 is preferably, for example, 0.5 or more, in a range in which the active material volume proportion is smaller than that of the portion close to positive-electrode current collector 11 in positive-electrode mixture layer 112. In addition, the porosity of the portion of positive-electrode mixture layer 112 close to solid electrolyte layer 40 is preferably, for example, in the range of 5% to 35% inclusive, and more preferably in the range of 8% to 15% inclusive, in a range in which the porosity is larger than the portion close to positive-electrode current collector 11 in positive-electrode mixture layer 112. Here, "the portion close to solid electrolyte layer 40 in positive-electrode mixture layer 112" refers to a region (region indicated by B in FIG. 4) in which the distance from the interface between positive-electrode mixture layer 112 and solid electrolyte layer 40 is within $\frac{1}{10}$ of the thickness of positive-electrode mixture layer 12 in the laminating direction.

In other words, in a case where positive-electrode mixture layer 112 is divided into divided portions by at least one plane (X-Y plane) orthogonal to the stacking axis (Z axis), the active material volume proportion is larger and the porosity is smaller in a divided portion closer to positive-electrode current collector 11 than in a divided portion far from positive-electrode current collector 11. In addition, in positive-electrode mixture layer 112, the active material volume proportion of the divided portion closest to positive-electrode current collector 11 may be larger than 0.7. In addition, in positive-electrode mixture layer 112, the active material volume proportion of the divided portion closest to solid electrolyte layer 40 may be 0.5 or more.

(Other Embodiments)

As described above, the all-solid battery according to the present disclosure has been described based on the embodiments, but the present disclosure is not limited to these embodiments. Without departing from the gist of the present disclosure, various modifications made to the embodiments by those skilled in the art or another form constructed by combining some components in the embodiments is also within the scope of the present disclosure.

For example, in the above-described embodiment, the all-solid battery including the positive-electrode mixture layer including two layers of the first positive-electrode mixture layer and the second positive-electrode mixture layer is not limited thereto, and the positive-electrode mixture layer may have three or more positive-electrode mixture layers of different compositions. Also, to the extent that the effects of the present disclosure are not impeded, locally, there may be a portion in which the active material volume proportion of the positive-electrode mixture layer does not increase from the boundary of the solid electrolyte layer of the positive-electrode mixture layer toward the boundary of the current collector interface or there may be a portion in which the porosity of the positive-electrode mixture layer does not decrease from the boundary of the solid electrolyte layer of the positive-electrode mixture layer toward the boundary of the current collector.

The positive-electrode layer, the negative-electrode layer, the solid electrolyte layer, and the all-solid battery using the same according to the present disclosure are expected to be applied to various batteries such as power supplies for portable electronic devices and in-vehicle batteries.

What is claimed is:

1. An all-solid battery comprising:
a positive-electrode layer that includes a positive-electrode current collector and a positive-electrode mixture layer, the positive-electrode mixture layer being disposed on the positive-electrode current collector and containing a positive-electrode active material and a solid electrolyte;
a negative-electrode layer that includes a negative-electrode current collector and a negative-electrode mixture layer, the negative-electrode mixture layer being disposed on the negative-electrode current collector and containing a negative-electrode active material and a solid electrolyte; and
a solid electrolyte layer that is disposed between the positive-electrode mixture layer and the negative-electrode mixture layer and contains a solid electrolyte having ion conductivity;
wherein, when a proportion of a volume of the positive-electrode active material to a sum of the volume of the positive-electrode active material and a volume of the solid electrolyte in the positive-electrode mixture layer is defined as an active material volume proportion,
in a case where the positive-electrode mixture layer is divided into divided portions by at least one plane orthogonal to a stacking axis, the active material volume proportion is larger and porosity is smaller in a divided portion closer to the positive-electrode current collector than in a divided portion far from the positive-electrode current collector, and
wherein each of the positive-electrode mixture layer, the negative-electrode mixture layer, and the solid electrolyte layer has a concentration of a solvent that is more than 0 ppm and 50 ppm or less and a concentration of a binder that is 100 ppm or less.

2. The all-solid battery of claim 1,
wherein in the positive-electrode mixture layer, the active material volume proportion of the divided portion closest to the positive-electrode current collector is larger than 0.7.

3. The all-solid battery of claim 1,
wherein in the positive-electrode mixture layer, the active material volume proportion of the divided portion closest to the solid electrolyte layer is 0.5 or more.

4. The all-solid battery of claim 1,
wherein the positive-electrode mixture layer includes a first positive-electrode mixture layer closer to the positive-electrode current collector and a second positive-electrode mixture layer closer to the solid electrolyte layer,
the active material volume proportion in the first positive-electrode mixture layer is larger than the active material volume proportion in the second positive-electrode mixture layer, and
porosity of the first positive-electrode mixture layer is smaller than porosity of the second positive-electrode mixture layer.

5. The all-solid battery of claim 4,
wherein the active material volume proportion in the first positive-electrode mixture layer is larger than 0.7.

6. The all-solid battery of claim 4,
wherein the porosity of the first positive-electrode mixture layer is 0.05% or more and 8% or less.

7. The all-solid battery of claim 4,
wherein the active material volume proportion in the second positive-electrode mixture layer is 0.5 or more.

8. The all-solid battery of claim 4,
wherein the porosity of the second positive-electrode mixture layer is 5% or more and 35% or less.

9. The all-solid battery of claim 1,
wherein the positive-electrode layer further includes a positive-electrode bonding layer disposed between the positive-electrode current collector and the positive-electrode mixture layer and containing at least a conductive agent.

* * * * *